United States Patent [19]

Chun

[11] Patent Number: 5,903,682
[45] Date of Patent: May 11, 1999

[54] OBJECT-ORIENTED IMAGE REPRESENTATION METHOD AND APPARATUS USING IRREGULAR MESHES

[75] Inventor: Kang-Wook Chun, Seoul, Rep. of Korea

[73] Assignee: Samsung Electronics Co., Ltd., Kyungki-do, Rep. of Korea

[21] Appl. No.: 08/857,590

[22] Filed: May 16, 1997

[30] Foreign Application Priority Data

May 17, 1996 [KR] Rep. of Korea ............... 96-16661

[51] Int. Cl.[6] ............................................. G06K 9/36
[52] U.S. Cl. ................................... 382/276; 345/419
[58] Field of Search .............................. 382/276, 293, 382/282, 100; 345/441, 423, 419, 443; 364/578

[56] References Cited

U.S. PATENT DOCUMENTS 5,315,537  5/1994  Blacker ................................. 364/578
5,602,979  2/1997  Loop .................................... 345/423

OTHER PUBLICATIONS

Chun K W et al; "Irregular Triangular Mesh Representation Based On Adaptive Control Point Removal", *Visual Communications and Image Processing '96*, vol. 2727, Mar. 1996, pp. 17–20.

Dudon M et al; "Motion Estimation and Triangular Active Mesh", *Soc. Belge Ing. Telecommun. & Electron*, Belgium, No. 4, pp. 47–53.

Yao Wang et al; "Active Mesh–A Feature Seeking and Tracking Image Sequence Representation Scheme", *IEEE Transactions on Image Processing*, vol. 3, No. 5, Sep. 1994, pp. 610–624.

European Search Report.

Kang W. Chun, Byenng woo Jeon, and Jae M. Jo "Irregular Triangular Mesh Reprentation Based on Adaptive Control Point Remover", Visual Communications and Image Processing '96, 17–20 Mar. 1996.

Salembler et al "Very Low Bit Rate Video Coding Using active Triangular Mesh" 1996 IEEE International Conference on Acoustics, Speech and Signal Processing Proceedings, Atlanta; May 7–10, 1996, pp. 2060–2063.

*Primary Examiner*—Yon J. Couso
*Attorney, Agent, or Firm*—Sughrue, Mion, Zinn, Macpeak & Seas, PLLC

[57] ABSTRACT

An object-oriented image representation apparatus using irregular meshes includes an object image extractor for extracting image blocks containing an object contained in a whole image from the whole image represented by received image data. A regular mesh former generates rectangular mesh data including fixed control points, floating control points and pixel data from the extracted object image. The fixed control points and the floating control points are vertex points belonging to an object image among vertex points of a plurality of the rectangular meshes which divide the whole image, and the fixed control points are vertex points located at the corners of the object image. An irregular mesh former receives the rectangular mesh data and repeats an operation for removing the floating control point having image descriptiveness of the lowest degree and an operation for dividing a region of support from which the floating control point is removed into polygonal meshes, until the number of the remaining floating control points reaches a predetermined threshold value.

20 Claims, 4 Drawing Sheets

−45° DIRECTION

+45° DIRECTION

OBJECT-ORIENTED IMAGE REPRESENTATION METHOD AND APPARATUS USING IRREGULAR MESHES

BACKGROUND OF THE INVENTION

The present invention relates to an object-oriented image representation method and apparatus using irregular meshes, and more particularly, to a method for representing an object contained in an image using an irregular mesh and an apparatus thereof.

An international standardization endeavor with respect to a moving image compression technology, such as an MPEG IV (Moving Picture Experts Group), for coding a moving image at a low bit rate for the purpose of application in a videophone or a video conference system, is in progress. To encode a moving image at a very low bit rate, various object-oriented motion image coding methods, each of which encodes a significant object in the motion image and transmits the encoded result, are widely under study. Also, to accomplish a motion compensation for removing a temporal correlation of a motion image, certain motion compensation methods are being widely studied. According to these motion compensation methods a spatial transformation, such as an image warping capable of more effectively representing an actual movement of an object, is applied to an image represented in the form of a mesh.

In the image representation, it can be seen that an irregular mesh can reflect the local features of an image very well and can represent the image features well using only a small number of control points.

SUMMARY OF THE INVENTION

In view of the above, it is an object of the present invention to provide a method for representing an object contained in an image using irregular meshes.

It is another object of the present invention to provide an apparatus embodying the above method.

To accomplish the above object of the present invention, there is provided an object-oriented image representation method using irregular meshes, comprising the steps of:

(a) extracting image blocks containing an object contained in a whole image from the whole image;

(b) generating rectangular mesh data including fixed control points, floating control points and pixel data from the image blocks extracted in step (a), in which the fixed control points and the floating control points are vertex points belonging to an object image among vertex points of a plurality of the rectangular meshes which divide the whole image and the fixed control points are vertex points located at the corners of the object image; and (c) repeating an operation for removing the floating control point having image descriptiveness of the lowest degree and an operation for dividing a region of support from which a center floating control point is removed into polygonal meshes, until the number of the remaining floating control points reaches a predetermined threshold value, based on the rectangular mesh data of step (b).

There is also provided an object-oriented image representation apparatus using irregular meshes comprising: object image extraction means for extracting image blocks containing an object contained in a whole image from the whole image represented by received image data; regular mesh formation means for receiving object image data from the object image extraction means and generating rectangular mesh data including fixed control points, floating control points and pixel data from the object image, in which the fixed control points and the floating control points are vertex points belonging to an object image among vertex points of a plurality of the rectangular meshes which divide the whole image, and the fixed control points are vertex points located at the corners of the object image; and irregular mesh formation means for receiving the rectangular mesh data supplied from the regular mesh formation means, and for repeating an operation for removing the floating control point having image descriptiveness of the lowest degree and an operation for dividing a region of support from which the floating control point is removed into polygonal meshes, until the number of the remaining floating control points reaches a predetermined threshold value.

BRIEF DESCRIPTION OF THE DRAWINGS

The present invention will be described in more detail with reference to the accompanying drawings in is which.

DETAILED DESCRIPTION OF THE PREFERRED EMBODIMENTS

Preferred embodiments of the present invention will be described with reference to the accompanying FIGS. 1 through 7.

Figure 1:
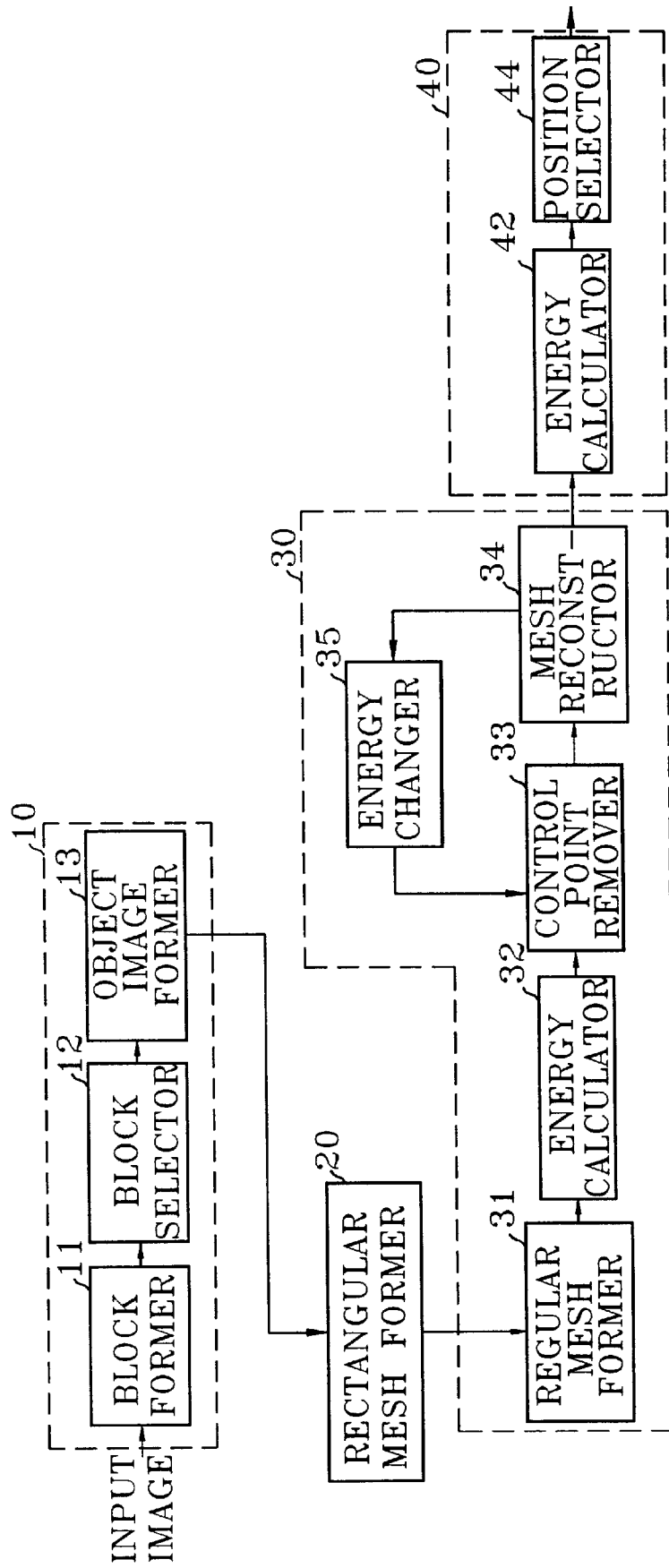
FIG. 1 is a block diagram of an object-oriented image representation apparatus using irregular meshes according to one embodiment of the present invention.
Figure 2C:
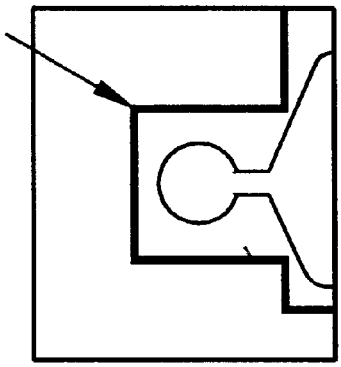
FIGS. 2A through 2C are conceptual diagrams for explaining a process of forming an object image containing an object.
Figure 2B:
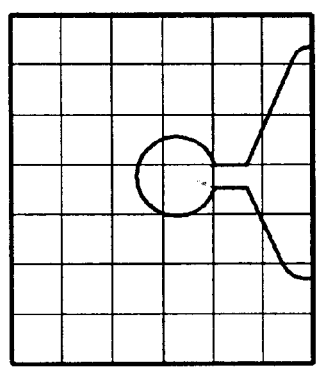
Figure 2A:
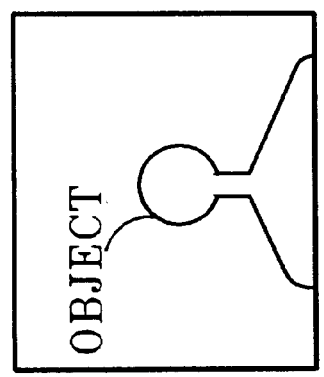

In FIG. 1 showing an object-oriented image representation apparatus using irregular meshes according to one embodiment of the present invention, an object image extractor 10 extracts an object from an image containing the object. Referring to FIG. 2A showing an example of an image containing an object, a block former 11 of the object image extractor 10 divides the image shown in FIG. 2A comprised of received image data into image blocks of an N×N size each image block having N×N pixels. The example of image division by the block former 11 is shown in FIG. 2B. The block former 11 outputs data of the image blocks obtained by the image division to a block selector 12. The block selector 12 selects image blocks containing image information of an object among the image blocks using the received data, and the data of the selected image block is output to an object image former 13. In this case, the block selector 12 does not output the data of the image blocks exclusive of the selected image blocks to the object image former 13. The object image former 13 merges the data received from the block selector 12 to thereby form and store an object image. The object image is comprised of the image blocks selected by the block selector 12, which is shown as an area enclosed by a thick solid line in FIG. 2C. The object image former 13 outputs the data of the object image comprised of the image blocks to a rectangular mesh former 20.

Figure 3:
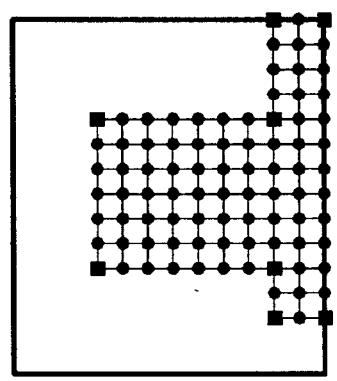
FIG. 3 is a conceptual diagram for explaining a meshed object image.

The rectangular mesh former 20 divides a whole image containing an object into grids of a K×K size. Here, each grid has a size including K×K pixels. The rectangular mesh former 20 determines vertex points included in the object image among the vertex points of each grid as initial control points, and determines each grid enclosed by the initial control points as a rectangular mesh. FIG. 3 shows an example of the rectangular meshes determined based on the object image shown in FIG. 2C. The rectangular meshes shown in FIG. 3 represent a case that the number of horizontal or vertical pixels of the image block described referring to FIG. 2 is an integer multiple of the number of the horizontal or vertical pixels of a grid having a K×K size. When the number of the horizontal or vertical pixels of the image block is not an integer multiple of the number of the horizontal or vertical pixels of the grid, the object image comprised of the rectangular meshes will differ from that comprised of the image blocks.

The rectangular mesh former 20 determines the initial control points located at the edges of the object image comprised of the rectangular meshes as fixed control points, and determines the initial control points which are not determined as the fixed control points as floating control points. Here, each rectangular mesh is represented by the data of the object image which exists in the rectangular mesh and the position information of a fixed control point or a floating control point belonging to the rectangular mesh. The rectangular mesh former 20 outputs the rectangular mesh data representing the object image comprised of the rectangular meshes.

An irregular mesh former 30 divides the individual rectangular meshes into irregular triangular meshes using the input rectangular mesh data. The irregular triangular meshes are generated based on a paper entitled "Irregular Triangular Mesh Representation Based on Adaptive Control Point Removal," published in *SPIE's* 1996 *symposium on Visual Communications and Image Processing,* by Kang W. Chun, Byungwoo Jean and Jae M. Jo. In the irregular mesh former 30, a regular triangular mesh former 31 receives rectangular mesh data from the rectangular former 20. The regular triangular mesh former 31 divides each rectangular mesh in the diagonal direction using the received rectangular mesh data. By such division, each rectangular mesh is divided into two regular triangular meshes.

Figure 4A:
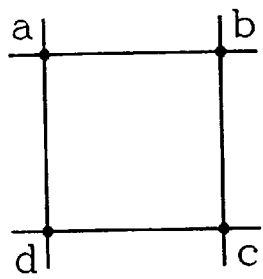
FIGS. 4A through 4C are a conceptual diagram for explaining a process of forming triangular meshes, respectively.
Figure 4B:
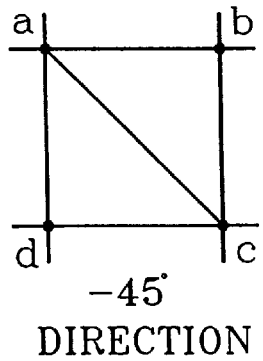
Figure 4C:
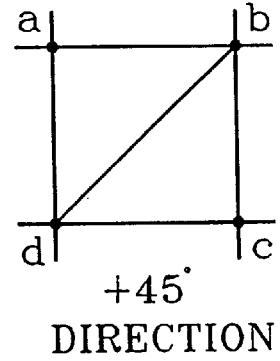

One example in which the regular triangular mesh former 31 forms the regular triangular meshes will be described with reference to FIGS. 4A through 4C. The regular triangular mesh former 31 uses similarity between pixel values belonging to the rectangular mesh to divide each rectangular mesh into the regular triangular meshes. FIG. 4A shows a rectangular mesh comprised of four control points a, b, c and d. If the pixel values of the control points a, b, c and d belonging to one rectangular mesh are P(a), P(b), P(c) and P(d), respectively, the regular triangular mesh former 31 calculates a similarity representation value $P_{-45}$ in −45 degree direction using |P(a)–P(c)|, and calculates a similarity representation value $P_{45}$ in +45 degree direction using |P(b)–P(d)|. The regular triangular mesh former 31 divides the rectangular mesh into two regular triangular meshes along the diagonal direction corresponding to a smaller value among the two similarity representation values $P_{-45}$ and $P_{45}$ FIG. 4B shows a division of the rectangular mesh in the case when the similarity representation value $P_{-45}$ is smaller than the similarity representation value $P_{45}$. FIG. 4C shows a division of the rectangular mesh in the case when the similarity representation value $P_{45}$ is smaller than the similarity representation value $P_{-45}$. The regular triangular mesh former 31 generates regular triangular mesh data representing the regular triangular meshes obtained by the division of all rectangular meshes. Such a regular triangular mesh data contains information about the positions of the above-described fixed control points and the floating points and the position information is supplied to an energy calculator 32.

The energy calculator 32 stores the received regular triangular mesh data in an internal memory (not shown), and calculates a first energy value corresponding to each floating control point using the stored data. The first energy value E(K) involving the floating control point K is represented as the following equation (1).

$$E(K) = \frac{1}{N_K} \sum_{(i,j) \in S_K} [g(i, j) - \hat{g}(i, j)]^2 \quad (1)$$

Figure 5A:
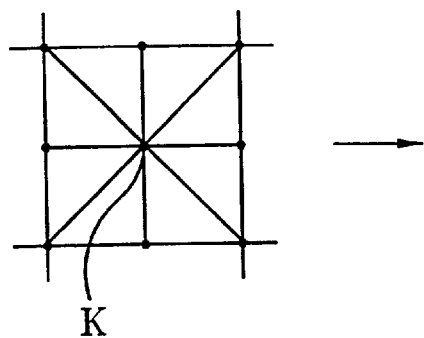
FIGS. 5A and 5B are a conceptual diagram for explaining a removal of a floating control point, respectively.
Figure 5B:
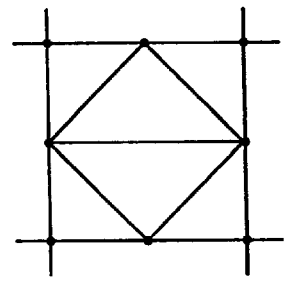

Here, $S_K$ represents a region of support corresponding to the floating control point K, and $N_K$ represents the number of pixels contained in the region of support $S_K$. g(i,j) represents a pixel value of the pixel having a position (i,j), and ĝ(i,j) represents an interpolated pixel value corresponding to the pixel value g(i,j). The interpolated pixel value ĝ(i,j) is calculated using the pixel value g(i,j) and the interpolation weight values corresponding to the pixel value g(i,j). The interpolation weight values for the pixel having the position (i,j) are uniquely determined using the pixel values of the control points contained in each triangular mesh to which a pixel having the position (i,j) belongs within the region of support $S_K$ before the central floating control point K is removed. Referring to FIG. 5A, the floating control point expressed as "K" has a support region enclosed by the neighboring eight control points. The energy calculator 32 calculates the first energy values using the above-described equation (1) with respect to all floating control points in the meshed object image, and stores the calculated first energy values in the internal memory in the form corresponding to the floating control points. The energy calculator 32 removes the floating control point located at the center of each region of support, and divides the region of support from which the floating control point has been removed into triangular meshes using a triangulation technique. The triangulation technique is disclosed in the above-described paper of Kang W. Chun, Byungwoo Jean and Jae M. Jo. FIG. 5B shows an example of new triangular meshes which divide the region of support from which the floating control point K has been removed.

The energy calculator 32 calculates a second energy value using the new triangular meshes contained in the region of support from which the central floating control point has been removed. The second energy value involving the floating control point K is represented as the above-described equation (1). However, in the calculation of the second energy, the interpolated pixel value ĝ(i,j) involving the pixel value g(i,j) is calculated using pixel values of the control points of new triangular meshes. In other words, the interpolation weight values for the pixel having a position (i,j) are uniquely determined using the pixel values of the control points contained in each triangular mesh to which the pixel having the, position (i,j) belongs. The energy calculator 32 calculates an energy difference value representing a difference between the first energy value and the second energy value corresponding to the first energy value whenever the first energy value and the corresponding second energy value are calculated. The signal processing of the energy calculator 32 does not restrict the present invention. Thus, the energy calculator 32 can be designed so that energy values corresponding to the respective floating control points are calculated after the first and second energy difference values corresponding to all the floating control points have been calculated. The energy calculator 32 outputs the calculated energy difference values to a control point remover 33 in the form corresponding to each floating control point. When the energy difference values corresponding to all the floating control points have been completely calculated, the energy calculator 32 outputs a signal representing completion of calculation of the energy difference values and the regular triangular mesh data received from the regular triangular mesh former 31, to the control point remover 33.

The control point remover 33 stores the data received from the energy calculator 32 in the internal memory. Thus, the energy difference values corresponding to all the floating control points and the regular triangular mesh data are stored in the internal memory of the control point remover 33. The control point remover 33 compares the energy difference value stored in the internal memory with each other to determine a minimum energy difference value, and removes the data of the determined minimum energy difference value and the corresponding floating control point from the internal memory. That is, the control point remover 33 removes the floating control point corresponding to the minimum energy difference value as a non-control point. The control point remover 33 outputs the number of the remaining floating control points, the data of the region of support involving the removed floating control point, and the triangular mesh data representing the triangular meshes adjacent to the region of support, to a mesh reconstructor 34.

The mesh reconstructor 34 divides the region of support from which the central floating control point is removed into the triangular meshes using the data which is received from the control point remover 33. The mesh reconstructor 34 applies the above-described triangulation technique with respect to the region of support from which the central floating control point has been removed. Therefore, the region of support from which the floating control point has been removed by the mesh reconstructor 34 is divided into the new triangular meshes. The mesh reconstructor 34 judges whether the number of the remaining floating control points is not more than a predetermined threshold value. When the remaining floating control points is more than a predetermined threshold value, the mesh reconstructor 34 outputs the data representing the newly obtained triangular meshes from the region of support from which the floating control point has been removed and the triangular meshes adjacent to the new triangular meshes to an energy changer 35. The energy changer 35 which receives the data from the mesh reconstructor 34 calculates an energy difference value with respect to the floating control points of the new triangular meshes. Each floating control point belonging to the new triangular meshes has a corresponding region of support as in the region of support described referring to FIG. 5A. Therefore, when the new triangular meshes are in the form shown in FIG. 5B, the energy changer 35 calculates new energy difference values corresponding to all the floating control points shown in FIG. 5B. The energy changer 35 outputs the data representing the calculated energy difference values and the corresponding floating control point, to the control point remover 33. The control point remover 33 determines the minimum energy difference value using the data received from the energy changer 35 and the energy difference value stored in the internal memory and removes the determined minimum energy difference value and the position data of the corresponding floating control point from the internal memory.

The removal operation of the floating control point and the corresponding energy difference value by the control point remover 33, the mesh reconstructor 34 and the energy changer 35, is repeated, until the number of the remaining floating control points is identical to the predetermined threshold value. If it is determined that the number of the remaining floating control points is identical to the predetermined threshold value, the mesh reconstructor 34 outputs the data of the floating control point and the triangular mesh data representing the triangular meshes, both of which remain in the control point remover 33, to a position mover 40.

Figure 6:
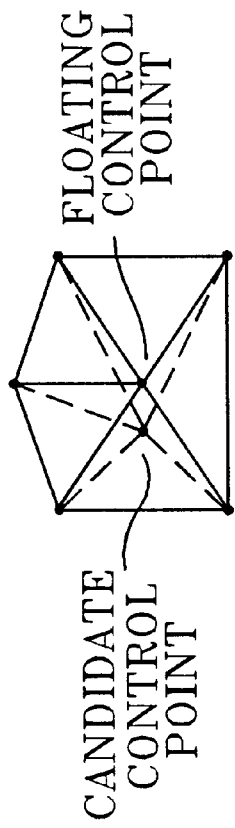
FIG. 6 is a conceptual diagram for explaining a process of deciding an optimal floating control point.

An energy calculator 42 in the position mover 40 determines candidate control points each having a pixel position adjacent to the floating control point for each floating control point, using the floating control point data and the triangular mesh data which is received from the control point remover 33. An example of a candidate control point selected by the energy calculator 42 is shown in FIG. 6. Preferably, the candidate control points are determined by four pixel positions or eight pixel positions which are just adjacent to the floating control point. Since determination of such candidate control points does not restrict the present invention, it is possible to further expand the range of selection of the candidate control points. The energy calculator 42 connects the determined candidate control points with the control points (i.e., fixed and/or floating control points) adjacent to the floating control points, to thereby form new triangular meshes. Then, the energy calculator 42 calculates a third energy value corresponding to each candidate control point corresponding to each floating control point.

The third energy value corresponding to each candidate control point is calculated according to the following equation (2).

$$EC(K) = \frac{1}{N_K} \sum_{(i,j) \in S_K} [g(i,j) - \hat{g}(i,j)]^2 \qquad (2)$$

Here, $S_K$ represents a region of support corresponding to the floating control point K, and $N_K$ represents the number of pixels contained in the region of support $S_K$. $g(i,j)$ represents a pixel value of the pixel having a position $(i,j)$, and $\hat{g}(i,j)$ represents an interpolated pixel value corresponding to the pixel value $g(i,j)$. The interpolated pixel value $\hat{g}(i,j)$ is calculated using the pixel value $g(i,j)$ and the interpolation weight values corresponding to the pixel value $g(i,j)$. The interpolation weight values for the pixel having the position $(i,j)$ are uniquely determined using the pixel values of the control points contained in each triangular mesh to which a pixel having the position $(i,j)$ belongs among the triangular meshes formed by each candidate control point and the control points located at the edge of the region of support $S_K$.

When the third energy values corresponding to all the candidate control points involving each floating control point are calculated, the energy calculator 42 outputs the data representing each floating control point and the corresponding candidate control points, and the third energy values involving each floating control point and the candidate control points, to a position selector 44. The energy calculator 42 also outputs the triangular mesh data received from the mesh reconstructor 34 to the position selector 44.

The position selector 44 determines a candidate control point or a floating control point corresponding to the minimum third energy value among the received third energy values as an optimal floating control point. The position mover 40 determines an optimal floating control point with respect to all the floating control points, and outputs the optimized irregular mesh data including the irregular meshes which are changed according to the determination of the optimal floating control points, the optimal fixed control points and the optimized floating control points, to a subsequent block (not shown).

A modified embodiment for producing the irregular polygonal meshes will be described with reference to FIG. 7.

Figure 7:
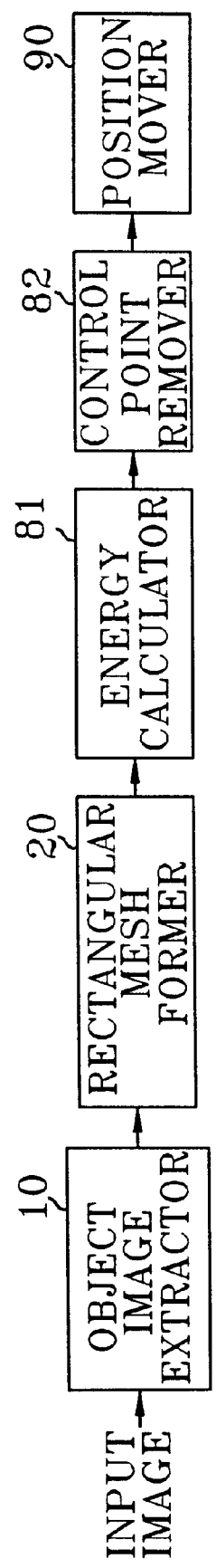
FIG. 7 is a block diagram showing a unit for forming irregular polygonal meshes according to another embodiment of the present invention.

The object image extractor 10 and the rectangular mesh former 20 shown in FIG. 7, are same as those of FIG. 1. An energy calculator 81 receives rectangular mesh data from the rectangular mesh former 20. The rectangular mesh data represents an object image comprised of rectangular meshes. The energy calculator 81 calculates fourth energy values individually corresponding to the floating control points within the meshed object region using the input rectangular mesh data. The energy calculator 81 uses the above-described equation (1) to calculate the fourth energy value. In this case, $S_K$ represents a region of support comprised of rectangular meshes enclosing the K-th floating control point. The interpolation weight values to obtain the interpolated value $ĝ(i,j)$ are determined using the pixel values of the control points belonging to the region of support. The energy calculator 81 calculates the fourth energy values involving each floating control point in the meshed object region, and stores the calculated fourth energy value in the internal memory (not shown) in the form corresponding to the floating control point. When the fourth energy values with respect to all the floating control points are completely calculated, the energy calculator 81 outputs a signal representing the completion of calculation of the fourth energy values to a control point remover 82. The control point remover 82 removes the floating control point corresponding to the smallest fourth energy value among the fourth energy values stored in the energy calculator 81 from the internal memory. In this case, the newly formed mesh has a size different from an existing rectangular mesh. When the number of the floating control points remaining in the energy calculator 81 has a value larger than a predetermined threshold value, the control point remover 82 outputs an energy calculation instruction to the energy calculator 81. The energy calculator 81 responding to the energy calculation instruction, newly calculates fourth energy values corresponding to the floating control points adjacent to removed floating control point and stores the calculated values. Also, the control point remover 82 removes the floating control point corresponding to the smallest fourth energy value among the fourth energy values stored in the energy calculator 81. If the floating control points are repeatedly removed by the energy calculator 81 and the control point remover 82, the initial regular rectangular meshes are deformed into the irregular polygonal meshes whose size and shape differ from each other. If a signal processing is repeated for removing the floating control points, the number of the floating control points remaining in the energy calculator 81 becomes the same as a predetermined threshold value. Here, the control point remover 82 reads the data representing the polygonal meshes stored in the energy calculator 81 and outputs the read polygonal mesh data to a position mover 90. The polygonal mesh data includes the data representing the fixed control points and the remaining floating control points and the image data involving the remaining polygonal meshes.

When the position mover 90 processes the polygonal mesh data described with reference to FIG. 7, the above-described equation (2) is changed to be adapted in the polygonal mesh structure. In the changed equation (2), the interpolation weight values for obtaining the interpolated value $ĝ(i,j)$ are determined using the pixel values of each candidate control point and the control points which are the vertex points of each polygonal mesh formed by the control points located at the edge of the region of support $S_K$. Since such a change is performed by the above-described equation (2) adapted for the triangular mesh structure to be adapted for the polygonal mesh structure, the detailed description thereof will be omitted.

As described above, the image representation apparatus according to the present invention can process signals much more efficiently by performing a mesh representation with respect to an object extracted from the image than the case where a whole image is represented with meshes. Therefore, an efficiency of use of a memory required for the image mesh representation can be optimized and a system having a proper memory capacity can be additionally designed.

What is claimed is:

1. An object-oriented image representation apparatus using irregular meshes comprising:

object image extraction means for extracting image blocks containing an object contained in a whole image from the whole image represented by received image data;

regular mesh formation means for receiving object image data from said object image extraction means and for generating rectangular mesh data including fixed control points, floating control points and pixel data from the object image, in which said fixed control points and said floating control points are first vertex points belonging to an object image among second vertex points of a plurality of the rectangular meshes which divide the whole image and said fixed control points are third vertex points located at the corners of the object image; and irregular mesh formation means for receiving the rectangular mesh data supplied from said regular mesh formation means, and repeating an operation for removing a selected one of said floating control points which has image descriptiveness of the lowest degree and an operation for dividing a region of support from which said one of said floating control points is removed into polygonal meshes, until the number of remaining floating control points reaches a predetermined threshold value.

2. The object-oriented image representation apparatus according to claim 1, wherein said object image extraction means comprises:

block formation means for dividing the whole image of the received image data into a plurality of image blocks each having a predetermined size;

block selection means for selecting image blocks containing an object in the whole image among the plurality of the image blocks divided by said block formation means; and object image formation means for merging the image blocks selected by said block selection means and outputting the merged image blocks as object image data.

3. The object-oriented image representation apparatus according to claim 1, wherein said irregular mesh formation means performs a division operation for dividing the region of support from which the central floating control point has been removed into triangular meshes.

4. The object-oriented image representation apparatus according to claim 3, wherein said irregular mesh formation means comprises:

regular triangular mesh formation means for determining a diagonal direction having a large degree of data similarity of each of the rectangular meshes using the rectangular mesh data supplied from said regular mesh formation means, and forming regular triangular meshes by dividing the rectangular meshes along the determined diagonal direction;

energy calculation means for calculating energy difference values individually corresponding to the floating control points, using the pixel data of the regular triangular meshes formed by said regular triangular mesh formation means;

control point removal means for determining a smallest energy difference value among the calculated energy difference values and removing the floating control point corresponding to the determined smallest energy difference value as a non-floating control point;

mesh reconstruction means, responsive to the floating control point removal operation of said control point removal means, for dividing the region of support from which the center floating control point has been removed into the triangular meshes until the number of the floating control points reaches a predetermined threshold value; and energy changing means for calculating the energy difference values individually corresponding to the floating control points contained in new triangular meshes using the new triangular meshes and neighboring ones of the triangular meshes obtained by said mesh reconstruction means, and supplying information representing the calculated energy difference values and the corresponding floating control points to said control point removal means.

5. The object-oriented image representation apparatus according to claim 4, wherein the energy difference value corresponding to each floating control point K represents a difference between a first energy value and a second energy value, wherein the first energy value E(K) involving the floating control point K is represented as the following equation, $$E(K) = \frac{1}{N_K} \sum_{(i,j) \in S_K} [g(i, j) - \hat{g}(i, j)]^2$$

wherein $S_K$ represents the region of support corresponding to the floating control point K, $N_K$ represents the number of pixels contained in the region of support $S_K$, $g(i,j)$ represents a pixel value of the pixel having a position $(i,j)$, and $\hat{g}(i,j)$ represents an interpolated pixel value corresponding to the pixel value $g(i,j)$, wherein the interpolated pixel value $\hat{g}(i,j)$ is calculated using the pixel value $g(i,j)$ and interpolation weight values corresponding to the pixel value $g(i,j)$, and the interpolation weight values for the pixel having the position $(i,j)$ are determined using the pixel values of the control points contained in each triangular mesh to which a pixel having the position $(i,j)$ belongs within the region of support $S_K$ before the central floating control point K is removed, and wherein the second energy value with respect to the floating control point K is calculated by the above equation using the interpolated pixel value determined by using the pixel values of the control points of the new triangular meshes, instead of the interpolated pixel value $\hat{g}(i,j)$ for the first energy value E(K).

6. The object-oriented image representation apparatus according to claim 1, wherein said irregular mesh formation means performs a division operation for dividing the region of support from which the center floating control point has been removed into polygonal meshes.

7. The object-oriented image representation apparatus according to claim 6, wherein said irregular mesh formation means comprises:

energy calculation means for receiving and storing the rectangular mesh data supplied from said regular mesh formation means and calculating and storing energy difference values individually corresponding to the floating control points using the stored rectangular mesh data; and control point removal means for repeating a removal operation of a floating control point corresponding to a smallest energy value among the energy values stored in said energy calculation means until the number of the remaining floating control points reaches the predetermined threshold value, wherein said energy calculation means newly calculates and stores the energy values corresponding to the floating control points contained in the region of support from which the center floating control point has been removed.

8. The object-oriented image representation apparatus according to claim 7, wherein said energy value is calculated by the following equation, $$E(K) = \frac{1}{N_K} \sum_{(i,j) \in S_K} [g(i, j) - \hat{g}(i, j)]^2$$

in which $S_K$ represents a region of support corresponding to the floating control point K, $N_K$ represents the number of pixels contained in the region of support $S_K$, $g(i,j)$ represents a pixel value of the pixel having a position $(i,j)$, and $\hat{g}(i,j)$ represents an interpolated pixel value corresponding to the pixel value $g(i,j)$, wherein the interpolated pixel value $\hat{g}(i,j)$ is calculated using the pixel value $g(i,j)$ and interpolation weight values corresponding to the pixel value $g(i,j)$, and the interpolation weight values for the pixel having the position $(i,j)$ are determined using the pixel values of the control points contained in the region of support $S_K$.

9. The object-oriented image representation apparatus according to claim 1, further comprises:

energy calculation means for calculating energy values involving each of said floating control points and a plurality of candidate control points having a neighboring pixel position in the region of support of each of said floating control points, with respect to the floating control points of the polygonal meshes which finally remain in said irregular mesh formation means; and means for determining a smallest energy value among the energy values calculated by said energy calculation means, and determining a control point corresponding to the determined energy value among said floating control points and said neighboring candidate control points as an optimal floating control point corresponding to each of said floating control points.

10. The object-oriented image representation apparatus according to claim 9, wherein said energy value is calculated by the following equation, $$E(K) = \frac{1}{N_K} \sum_{(i,j) \in S_K} [g(i, j) - \hat{g}(i, j)]^2$$

wherein, $S_K$ represents a region of support corresponding to the floating control point K, $N_K$ represents the number of pixels contained in the region of support $S_K$, $g(i,j)$ represents a pixel value of the pixel having a position $(i,j)$, and $\hat{g}(i,j)$ represents an interpolated pixel value corresponding to the pixel value $g(i,j)$, wherein the interpolated pixel value $\hat{g}(i,j)$ is calculated using the pixel value $g(i,j)$, and interpolation weight values corresponding to the pixel value $g(i,j)$, and the interpolation weight values for the pixel having the position $(i,j)$ are determined using the pixel values of the control points of the triangular meshes to which the pixel having a position $g(i,j)$ belongs among the triangular meshes formed by the floating control point or each of said candidate control points and the control points located at an edge of the region of support $S_K$.

11. An object-oriented image representation method using irregular meshes, comprising the steps of:

(a) extracting image blocks containing an object contained in a whole image from the whole image;

(b) generating rectangular mesh data including fixed control points, floating control points and pixel data from the image blocks extracted in step (a), in which said fixed control points and said floating control points are first vertex points belonging to an object image among second vertex points of a plurality of the rectangular meshes which divide the whole image and the fixed control points are third vertex points located at the corners of the object image; and (c) repeating an operation for removing said floating control point having image descriptiveness of a lowest degree and an operation for dividing a region of support from which a center floating control point is removed into polygonal meshes, until the number of remaining floating control points reaches a predetermined threshold value, based on the rectangular mesh data of step (b).

12. The object-oriented image representation method using irregular meshes according to claim 11, wherein said step (a) comprises the sub-steps of:

(a1) dividing the whole image into a plurality of image blocks each having a first predetermined size; and (a2) selecting image blocks which contain an object in the whole image among the plurality of the image blocks of sub-step (a1).

13. The object-oriented image representation method according to claim 11, wherein in said step (c), a division operation is performed for dividing the region of support from which the center floating control point has been removed into triangular meshes.

14. The object-oriented image representation method according to claim 13, wherein said step (c) comprises the sub-steps of:

(c1) determining a diagonal direction having a large degree of data similarity of each rectangular mesh using the rectangular mesh data of said step (b) and forming regular triangular meshes by dividing the rectangular meshes along the determined diagonal direction;

(c2) calculating energy difference values individually corresponding to the floating control points using the pixel data of the regular triangular meshes formed in said sub-step (c1);

(c3) determining a smallest energy difference value among the energy difference values calculated in said sub-step (c2) and removing the floating control point corresponding to the determined energy difference value as a non-floating control point;

(c4) dividing the region of support from which the center floating control point has been removed in said sub-step (c3) into the triangular meshes when the number of the floating control points is more than predetermined threshold value; and (c5) calculating the energy difference values individually corresponding to the floating control points contained in new triangular meshes using the new triangular meshes and the neighboring triangular meshes obtained in said sub-step (c4).

15. The object-oriented image representation method according to claim 14, wherein the energy difference value corresponding to each floating control point K represents a difference between a first energy value and a second energy value, wherein the first energy value E(K) with respect to the floating control point K is represented as the following equation, $$E(K) = \frac{1}{N_K} \sum_{(i,j) \in S_K} [g(i, j) - \hat{g}(i, j)]^2$$

wherein, $S_K$ represents the region of support corresponding to the floating control point K, $N_K$ represents the number of pixels contained in the region of support $S_K$, $g(i,j)$ represents a pixel value of the pixel having a position $(i,j)$, and $\hat{g}(i,j)$ represents an interpolated pixel value corresponding to the pixel value $g(i,j)$, wherein the interpolated pixel value $\hat{g}(i,j)$ is calculated using the pixel value $g(i,j)$ and interpolation weight values corresponding to the pixel value $g(i,j)$, and the interpolation weight values for the pixel having the position $(i,j)$ are determined using the pixel values of the control points contained in each triangular mesh to which a pixel having the position $(i,j)$ belongs within the region of support $S_K$ before the central floating control point K is removed, and wherein the second energy value with respect to the floating control point K is calculated by the above equation using the interpolated pixel value determined by using the pixel values of the control points of the new triangular meshes instead of the interpolated pixel value $\hat{g}(i,j)$.

16. The object-oriented image representation method according to claim 11, wherein in said step (c), a division operation is performed for dividing the region of support from which the center floating control point has been removed into rectangular meshes.

17. The object-oriented image representation method according to claim 16, wherein said step (c) comprises the sub-steps of:

(c1) calculating and storing energy difference values individually corresponding to the floating control points using the stored rectangular mesh data of said step (b);

(c2) removing the floating control point corresponding to a smallest energy value among the energy values stored in said sub-step (c1);

(c3) calculating the energy values corresponding to the floating control points belonging to the region of support from which the center floating control point has been removed; and (c4) repeating a removal operation of a floating control point and a calculation operation of the energy values corresponding to the floating control points belonging to the corresponding region of support until the number of the remaining floating control points reaches the predetermined threshold value.

18. The object-oriented image representation method according to claim 17, wherein said energy value is calculated by the following equation, $$E(K) = \frac{1}{N_K} \sum_{(i,j) \in S_K} [g(i,j) - \hat{g}(i,j)]^2$$

in which $S_K$ represents the region of support corresponding to the floating control point K, $N_K$ represents the number of pixels contained in the region of support $S_K$, $g(i,j)$ represents a pixel value of the pixel having a position $(i,j)$, and $\hat{g}(i,j)$ represents an interpolated pixel value corresponding to the pixel value $g(i,j)$, wherein the interpolated pixel value $\hat{g}(i,j)$ is calculated using the pixel values $g(i,j)$ and interpolation weight values corresponding to the pixel value $g(i,j)$, and the interpolation weight values for the pixel having the position $(i,j)$ are determined using the pixel values of the control points contained in the region of support $S_K$.

19. The object-oriented image representation method according to claim 11, further comprising the steps of:

(d) calculating energy values involving each of said floating control points and a plurality of candidate control points having a neighboring pixel position in the region of support of each of said floating control points, with respect to the respective floating control points of the polygonal meshes which finally remain in said step (c); and (e) determining a smallest energy value among the energy values calculated by said step (d) and determining a control point corresponding to the determined energy value among said floating control points and said neighboring candidate control points as an optimal floating control point corresponding to each of said floating control points.

20. The object-oriented image representation method according to claim 19, wherein said energy value is calculated by the following equation, $$E(K) = \frac{1}{N_K} \sum_{(i,j) \in S_K} [g(i,j) - \hat{g}(i,j)]^2$$

wherein, $S_K$ represents a region of support corresponding to the floating control point K, $N_K$ represents the number of pixels contained in the region of support $S_K$, $g(i,j)$ represents a pixel value of the pixel having a position $(i,j)$, and $\hat{g}(i,j)$ represents an interpolated pixel value corresponding to the pixel value $g(i,j)$, wherein the interpolated pixel value $\hat{g}(i,j)$ is calculated using the pixel value $g(i,j)$ and interpolation weight values corresponding to the pixel value $g(i,j)$, and the interpolation weight values for the pixel having the position $(i,j)$ are determined using the pixel values of the control points of the triangular meshes to which the pixel having a position $g(i,j)$ belongs among the triangular meshes formed by the floating control point or each of said candidate control points and the control points located at an edge of the region of support $S_K$.

\* \* \* \* \*